US012360158B2

(12) United States Patent
Bellus et al.

(10) Patent No.: US 12,360,158 B2
(45) Date of Patent: Jul. 15, 2025

(54) METHOD OF CREATING AN ELECTRONICALLY READABLE OPTICAL FINGERPRINT TO PROTECT AN ELECTRICAL INTERCONNECT

(71) Applicant: Raytheon Company, Waltham, MA (US)

(72) Inventors: Peter A. Bellus, Tucson, AZ (US); Patrick M. Sain, Torrance, CA (US)

(73) Assignee: RAYTHEON COMPANY, Waltham, MA (US)

( * ) Notice: Subject to any disclaimer, the term of this patent is extended or adjusted under 35 U.S.C. 154(b) by 608 days.

(21) Appl. No.: 17/530,922

(22) Filed: Nov. 19, 2021

(65) Prior Publication Data

US 2023/0160956 A1     May 25, 2023

(51) Int. Cl.
*G01R 31/308*     (2006.01)
*G06F 21/30*     (2013.01)
(Continued)

(52) U.S. Cl.
CPC .......... *G01R 31/308* (2013.01); *G06F 21/30* (2013.01); *G06F 21/44* (2013.01); *G06F 21/57* (2013.01);
(Continued)

(58) Field of Classification Search
CPC ....... G01R 31/308; G06F 21/30; G06F 21/44; G06F 21/57; G06F 2221/034;
(Continued)

(56) References Cited

U.S. PATENT DOCUMENTS 5,420,689 A * 5/1995 Siu .................. G01N 21/956
356/601
8,760,075 B1 * 6/2014 Tischler .............. H05B 45/382
315/307
(Continued)

FOREIGN PATENT DOCUMENTS

EP     3654682 A1     5/2020
JP     2007050643 A     3/2007
(Continued)

OTHER PUBLICATIONS

International Search Report and Written Opinion Issued in International Application No. PCT/US2022/050383 mailed Mar. 15, 2023; 12 Pages.
(Continued)

*Primary Examiner* — Bryan F Wright
(74) *Attorney, Agent, or Firm* — CANTOR COLBURN LLP

(57) ABSTRACT

An electrical system includes a signal security detection system performing a method of determining a security of an interconnect. An interconnect extended between a first device and a second device. The interconnect has at least one conductive pathway aligned along a direction between the first device and the second device. A light source is configured to transmit a light through the interconnect and an optical detector is configured to receive the light passing through the interconnect. A processor records a first optical signature of the interconnect based on the light received at the optical detector at a first time, records a second optical signature of the interconnect based on the light received at the optical detector at a second time, and validates the second optical signature against the first optical signature to determine a security of the interconnect.

18 Claims, 5 Drawing Sheets

(51) Int. Cl.
*G06F 21/44* (2013.01)
*G06F 21/57* (2013.01)
*H01L 25/16* (2023.01)
*H10F 55/20* (2025.01)
*H04L 9/40* (2022.01)

(52) U.S. Cl.
CPC ............ *H01L 25/167* (2013.01); *H10F 55/20* (2025.01); *G06F 2221/034* (2013.01); *H04L 63/00* (2013.01)

(58) Field of Classification Search
CPC ....... H01L 25/167; H01L 31/16; H04L 63/00; H04L 63/126; H04L 63/1466; H04L 63/123; H04W 12/108; H04W 12/122
USPC ............................................................ 726/2
See application file for complete search history.

(56) References Cited

U.S. PATENT DOCUMENTS

| | | |
|---|---|---|
| 9,363,083 B1 | 6/2016 | Durst et al. |
| 9,818,499 B2 | 11/2017 | Burnham et al. |
| 10,417,409 B2 | 9/2019 | Rowe |
| 10,598,592 B1* | 3/2020 | Wayne .................. G01N 21/55 |
| 2014/0186032 A1* | 7/2014 | Louderback ....... H04B 10/0799 398/38 |
| 2014/0232974 A1 | 8/2014 | Tomkins |
| 2014/0233141 A1* | 8/2014 | Blemel ................ H02H 1/0023 361/78 |
| 2018/0269250 A1* | 9/2018 | Chow .................... H04N 25/75 |
| 2020/0173876 A1 | 6/2020 | Jackson et al. |
| 2021/0091952 A1 | 3/2021 | Wentz |
| 2021/0241409 A1 | 8/2021 | Nayshtut et al. |

FOREIGN PATENT DOCUMENTS

| | | |
|---|---|---|
| JP | 2015503178 A | 1/2015 |
| WO | 2012128997 A1 | 9/2012 |

OTHER PUBLICATIONS

Kim, Y., et al., "CamPUF: Physically Unclonable Function Based on CMOS Image Sensor Fixed Pattern Noise", Proceedings of the 55th Annual Design Automation Conference, DAC 2018, pp. 66:1-66:6. ACM, New York (2018). URL: https://doi.org/10.1145/3195970.3196005.

Nakayama, K., et al., "Optical security device providing fingerprint and designed pattern indicator using fingerprint texture in liquid crystal," Optical Engineering, Apr. 2012/vol. 51(4), 4 Pages, SPIE, Downloaded From: https://www.spiedigitallibrary.org/journals/Optical-Engineering on Sep. 30, 2021.

Pappu, R., et al., "Physical One-Way Functions", Science, Sep. 20, 2002, vol. 297, Issue 5589, pp. 2026-2030, URL: www.sciencemag.org, DOI: 10.1126/science. 1074376.

Office Action issued in Japanese Patent Application No. 2024-527115; Date of Mailing Apr. 22, 2025 (8 pages).

* cited by examiner

METHOD OF CREATING AN ELECTRONICALLY READABLE OPTICAL FINGERPRINT TO PROTECT AN ELECTRICAL INTERCONNECT

BACKGROUND

The present disclosure relates to the security of electronic communications and, in particular, to a system and method for determining an integrity of an electronic interconnect between electrical devices.

In various electrical system, the security of electronic communication between components of the system is an important issue. An interconnect between two electrical devices provides an electrically conductive pathway by which electrical signals can be sent back and forth. The electrical interconnect is a point of vulnerability, since tapping into the interconnect provides a means of gaining access to information being exchanged along the interconnect. While the interconnect can be monitored electrically, such monitoring comes with a penalty in the performance of the communication and requires additional equipment. Therefore, there is a need to monitor the security of the electrical interconnect that can be integrated into the electrical system without incurring a performance penalty.

SUMMARY

According to one embodiment of the present disclosure, a method of determining a security of an interconnect is disclosed. Light from a light source is transmitted through an interconnect between a first device and second device, the interconnect including at least one conductive pathway aligned along a direction between the first device and the second device. A first optical signature of the conductive pathway is recorded based on the light received at an optical detector upon passing through the interconnect at a first time. A second optical signature of the conductive pathway is recorded based on the light received at an optical detector upon passing through the interconnect at a second time. The second optical signature is validated against the first optical signature to determine the security of the interconnect.

According to another embodiment of the present disclosure, a signal security detection system is disclosed. The system includes an interconnect between a first device and second device, the interconnect having at least one conductive pathway aligned along a direction between the first device and the second device, a light source for transmitting a light through the interconnect, an optical detector for receiving the light passing through the interconnect, and a processor. The processor is configured to record a first optical signature of the interconnect based on the light received at the optical detector at a first time, record a second optical signature of the interconnect based on the light received at the optical detector at a second time, and validate the second optical signature against the first optical signature to determine a security of the interconnect.

According to yet another embodiment of the present disclosure, an electrical system is disclosed. The electrical system includes a first device, a second device and an interconnect between the first device and the second device, the interconnect having at least one conductive pathway aligned along a direction between the first device and the second device. The system also includes a light source for transmitting a light through the interconnect, an optical detector for receiving the light passing through the interconnect, and a processor. The processor is configured to record a first optical signature of the interconnect based on the light received at the optical detector at a first time, record a second optical signature of the interconnect based on the light received at the optical detector at a second time, and validate the second optical signature against the first optical signature to determine a security of the interconnect.

Additional features and advantages are realized through the techniques of the present disclosure. Other embodiments and aspects of the disclosure are described in detail herein and are considered a part of the claimed disclosure. For a better understanding of the disclosure with the advantages and the features, refer to the description and to the drawings.

BRIEF DESCRIPTION OF THE SEVERAL VIEWS OF THE DRAWINGS

The subject matter which is regarded as the disclosure is particularly pointed out and distinctly claimed in the claims at the conclusion of the specification. The forgoing and other features, and advantages of the disclosure are apparent from the following detailed description taken in conjunction with the accompanying drawings in which:

DETAILED DESCRIPTION

Figure 1:
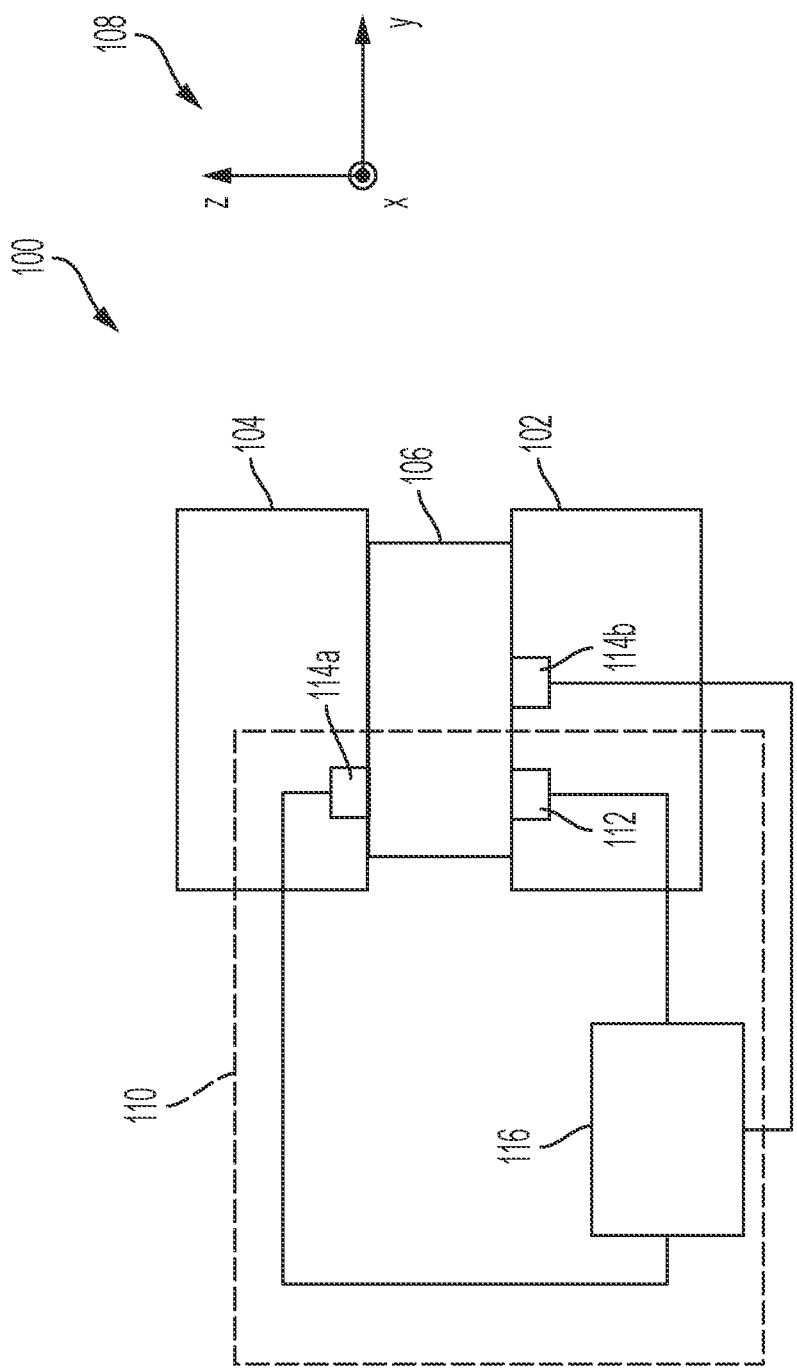
FIG. 1 shows a schematic diagram of an electrical system, in an illustrative embodiment.

FIG. 1 shows a schematic diagram of an electrical system 100, in an illustrative embodiment. The electrical system 100 includes a first device 102, a second device 104 and an interconnect 106 between the first device 102 and the second device 104 for secure signal transmission. The interconnect 106 includes conductive pathways therein for transmission of a signal between the first device 102 and the second device 104. The conductive pathways can be electrically conductive pathways or electrically conductive structures for transmission of an electrical signal between the first device 102 and the second device 104. A coordinate system 108 is shown to identify an alignment direction of various components of the electrical system. For illustrative purposes, the interconnect 106 extends along the z-axis to connect the first device 102 to the second device 104. The z-axis is aligned in a direction between the first device 102 and the second device 104.

The electrical system 100 further includes a signal security detection system 110 suitable for determining whether a signal pathway provided by the interconnect 106 is secure or if the interconnect (and, by extension, the signal pathway) has been changed or degraded. The signal security detection system 110 includes a light source 112 that illuminates the interconnect 106 with a light beam and an optical detector 114a that receives the light beam after it has interacted with the interconnect 106. In various embodiments, the optical detector 114a includes one or more photodetectors. The light source 112 and the optical detector 114a are coupled to a processor 116. The processor 116 can activate the light source 112 to generate a light beam. The light beam is transmitted through the interconnect 106 to cause a pattern of light to be received at the optical detector 114a due to passage of the light beam through the interconnect 106. The processor 116 records or generates an optical signature from the pattern of light. By obtaining optical signatures at a first time and a second time, the processor 116 can determine the integrity of the interconnect 106, i.e., whether the interconnect is secure or has been changed, using the methods disclosed herein.

In one embodiment, the light source 112 can be an integrated component or embedded component of the first device 102 and the optical detector 114a can be an integrated component or an embedded component of the second device 104. The optical signature is therefore based on an image of light transmitted through the interconnect 106. Alternatively, the signal security detection system 110 can include an optical detector 114b that is an integrated component or embedded component of the first device 102. The optical signature at the optical detector 114b is based on an image of light reflected from the interconnect 106. The light source 112 can alternatively be located in the second device 104. However, the placement of the light source 112 and the optical detectors 114a, 114b in either of the first device 102 and the second device 104 is not meant to be a limitation of the invention. In an alternative embodiment, a light source 112 and optical detector 114a, 114b can be external to the first device 102 and/or the second device 104.

Figure 2:
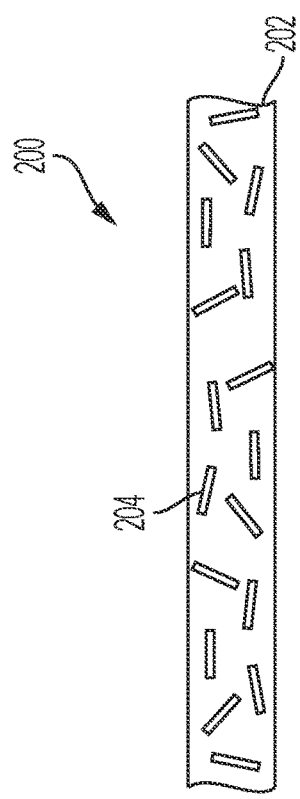
FIG. 2 shows a perspective view of a bonding material used to form an interconnect of the electrical system of FIG. 1.

FIG. 2 shows a perspective view of a bonding material 200 used to form the interconnect 106 of FIG. 1. The bonding material 200 includes a matrix material 202, such as an epoxy material, and a plurality of conductive particles disposed within the matrix material 202. The matrix material is a transparent or semi-transparent material. In various embodiments, the conductive particles are electrically conductive particles 204. The electrically conductive particles 204 can be opaque to light within a visible band and/or infrared band of the electromagnetic spectrum.

Figure 3:
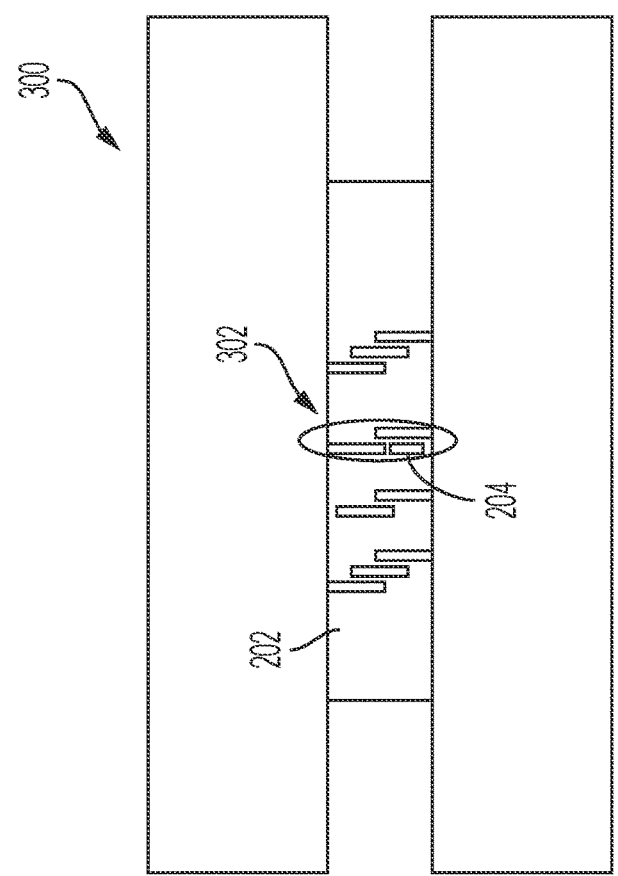
FIG. 3 shows an arrangement of the bonding material between a first device and second device of the electrical system.

FIG. 3 shows an arrangement of the bonding material between the first device 104 and second device 104 to form the interconnect 106. The electrically conductive particles 204 are aligned along the z-direction and arranged into electrically conductive columns 320 that are also aligned long the z-direction. The electrically conductive particles 204 within an electrically conductive column 302 establish an electrically conductive pathway 318 between the first device 102 and the second device 104. An electrically conductive columns 302 is characterized by columnar volume or cylindrical volume within which the electrically conductive particles 204 are randomly arranged or having a non-deterministic arrangement within the cylindrical volume. Each cylindrical volume is spaced apart from its neighboring cylindrical volumes by a region of the epoxy material that has little or no electrically conductive particles 204 therein. The electrically conductive columns 320 can be formed by applying a magnetic field in the z-direction during a bonding process or by orienting conductive fibers in a polymer matrix and slicing the composite more or less perpendicular to the fiber orientation.

Figure 4:
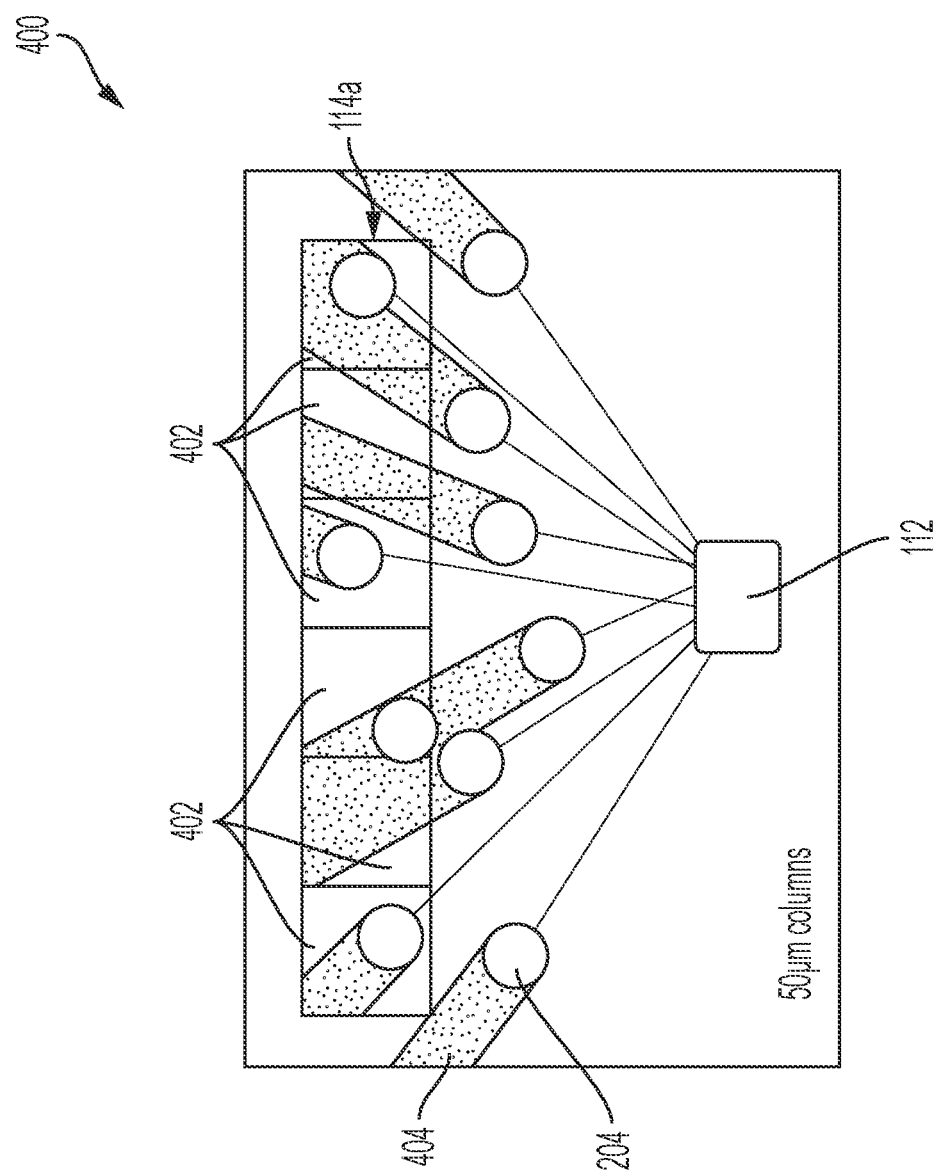
FIG. 4 shows a diagram illustrating an effect of the arrangement the electrically conductive particles in forming an optical signature.

FIG. 4 shows a diagram 400 illustrating an effect of the arrangement of the electrically conductive particles 204 in forming an optical signature. The optical signature is created by passing a light from the light source 112 through the interconnect to be recorded at the optical detector 114a. The optical detector 114a can include a plurality of photosensitive devices 402. The electrically conductive particles 204 create a random arrangement of shadows 404 at the optical detector 114a.

Due to the unique pattern presented by the random arrangement of electrically conductive particles 204, it is difficult for an entity to make a change to the interconnect without changing the optical signature noticeably. In addition, since the electrically conductive particles 204 are arranged randomly, it is difficult for an entity that does make a change to the interconnect to be able to reproduce the original arrangement of electrically conductive particles 204. Thus, any changes to the interconnect can be identified by identifying a change in the optical signature.

In order to inspect the optical signal, the light source 112 is activated and a first optical signature is obtained at a first time based on the original arrangement of the electrically conductive particles 204. At a second time subsequent to the first time, the light source is again activated and a second optical signature is obtained. The processor 116 validates the second optical signature against the first optical signature. If the second optical signature substantially matches or is the same as the first optical signature, the processor 116 outputs a verification signal to indicate that the interconnect is secure and has not been changed. If the second optical signature substantially does not match or is not the same as the first optical signature, the processor 116 outputs a warning signal to indicate that the interconnect is no longer secure or has been changed.

Figure 5:
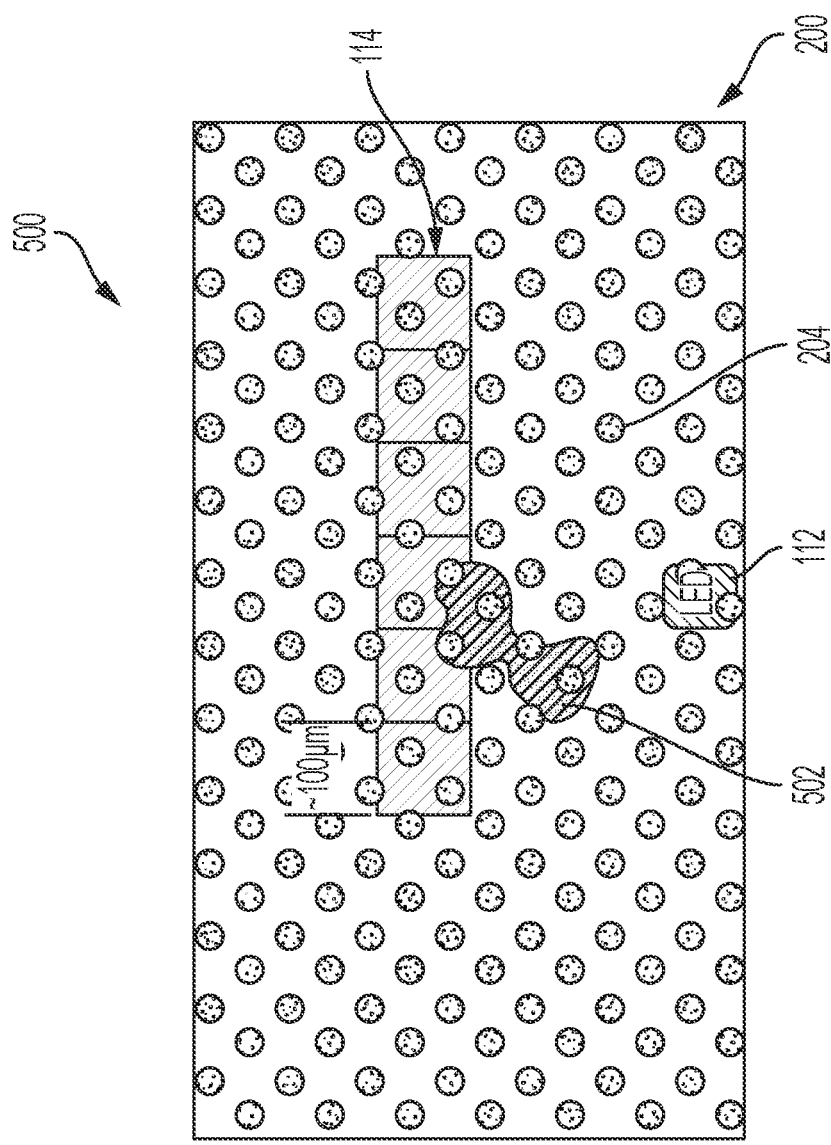
FIG. 5 shows a diagram illustrating a method for enhancing an optical signature using a dye.

FIG. 5 shows a diagram 500 illustrating a method for enhancing an optical signature using a dye 502. The dye 502 is introduced at one or more selected locations in the bonding material 200 between the light source 112 and the optical detector 114a during the bonding process. The dye 502 can affect the wavelength recorded in a section of the optical signature. The optical signatures therefore include the effects of the dye on the light passing through the interconnect. Due to the random placement of the dye 502, the security provided by the optical signature is increased.

Figure 6:
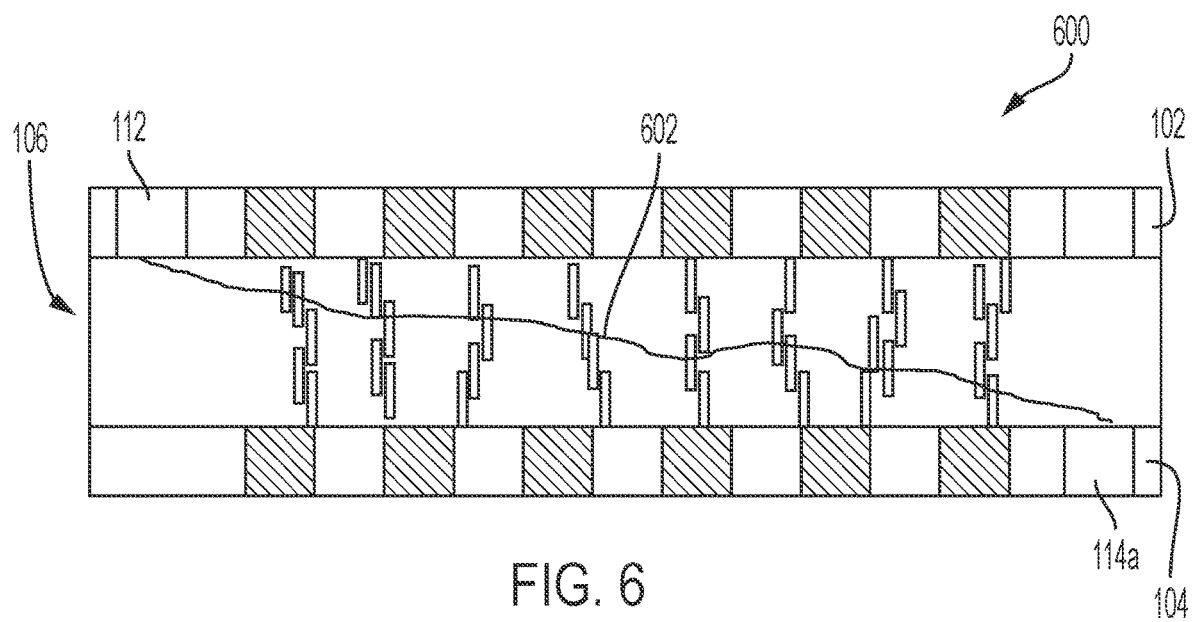
FIG. 6 shows a diagram of the electrical system in an embodiment illustrating an optical path for light traveling through an interconnect.

FIG. 6 shows a diagram 600 of the electrical system 100 in an embodiment illustrating an optical path 602 for light traveling through an interconnect 106. The light source 112 is disposed within the first device 102 and the optical detector 114a is disposed within the second device 104. The light from the light source 112 reaches the optical detector 114a via an optical path 602 formed primarily through transmission and refraction through the bonding material and reflection from the electrically conductive particles.

Figure 7:
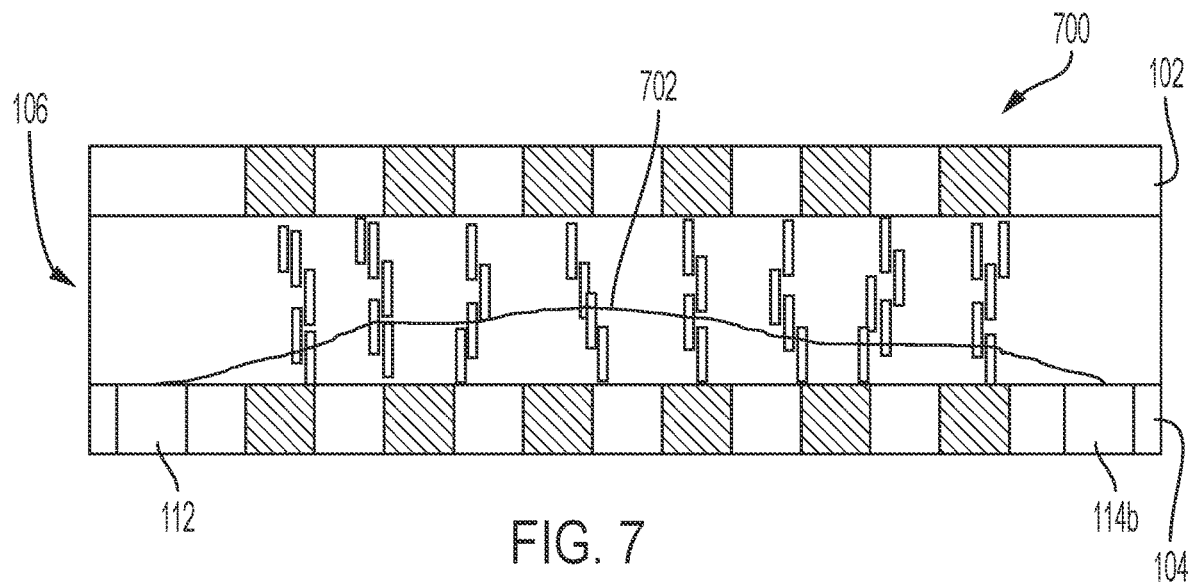
FIG. 7 shows a diagram for an electrical system in an embodiment illustrating an alternate optical path for light traveling through the interconnect.

FIG. 7 shows a diagram 700 for an electrical system 100 in an embodiment illustrating an alternate optical path 702 for light traveling through the interconnect 106. The light source 112 and the optical detector 114b are both disposed within the first device 102. The light from the light source 112 reaches the optical detector 114b via an alternate optical path 702 formed primarily through reflection from the electrically conductive particles.

While the present invention discloses conductive pathways that are electrically conductive and which includes conductive particles that are electrically conductive, this is not meant to be a limitation of the invention. In various embodiments, a conductive pathway can be a thermally conductive pathway that includes thermal conductive particles. Addition, a conductive pathway can be both electrically conductive and thermally conductive and include particles that are both electrically conductive and thermally conductive.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for exemplary embodiments with various modifications as are suited to the particular use contemplated.

While the exemplary embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method of determining a security of an interconnect between a first device and a second device, comprising:
    transmitting a light at a first time from a light source embedded within the first device through the interconnect, the interconnect including a bonding material between the first device and the second device and at least one electrically conductive pathway passing from the first device to the second device through the bonding material, the at least one electrically conductive pathway suitable for transmission of an electrical signal from the first device to the second device, wherein the light source is embedded in the first device, wherein the light passes through the bonding material and interacts with the at least one electrically conductive pathway within the bonding material to create a first spatial pattern of light and shadow;
    receiving the first spatial pattern of light and shadow at an optical detector;
    recording the first spatial pattern of light and shadow as a first optical signature of the conductive pathway;
    transmitting the light from the light source through the bonding material at a second time to interact with the at least one electrically conductive pathway to create a second spatial pattern of light and shadow;
    recording the second spatial pattern of light and shadow as a second optical signature of the conductive pathway; and
    comparing the second optical signature to the first optical signature to determine the security of the interconnect.

2. The method of claim 1, wherein the at least one electrically conductive pathway includes an electrically conductive column aligned between the first device and second device, the electrically conductive column including conductive particles having a non-deterministic arrangement within a columnar volume extending from the first device to the second device, wherein the first optical signature and the second optical signature include the effects of the non-deterministic arrangement.

3. The method of claim 1, further comprising illuminating the bonding material with the light to record at least one of the first optical signature and the second optical signature.

4. The method of claim 3, further comprising recording the at least one of the first optical signature and the second optical signature at an optical detector embedded within the first device.

5. The method of claim 3, further comprising recording the at least one of the first optical signature and the second optical signature at an optical detector embedded within the second device.

6. The method of claim 4, wherein the light source generates the light within at least one of a visible band and an infrared band.

7. The method of claim 1, further comprising forming the interconnect with a dye disposed at a selected location in the interconnect, wherein the first optical signature and the second optical signature include the effects of the dye.

8. A signal security detection system, comprising:
    an interconnect between a first device and second device, the interconnect including a bonding material between the first device and the second device and at least one conductive pathway passing from the first device to the second device through the bonding material, the at least one electrically conductive pathway suitable for transmission of an electrical signal from the first device to the second device; and
    a light source embedded within the first device for transmitting a light through the interconnect;
    an optical detector for receiving the light passing through the interconnect; and
    a processor configured to:
    record a first optical signature of the interconnect at the optical detector at a first time, wherein the first optical signature is a first spatial pattern of light and shadow caused by the light from the light source passing through the bonding material, interacting with the at least one electrically conductive pathway within the bonding material, and being received at the optical detector at the first time;
    record a second optical signature of the interconnect based on the light received at the optical detector at a second time, wherein the second optical signature is a second spatial pattern of light and shadow caused by the light from the light source passing through the bonding material, interacting with the at least one electrically conductive pathway within the bonding material, and being received at the optical detector at the second time; and
    compare the second optical signature to the first optical signature to determine a security of the interconnect.

9. The signal security detection system of claim 8, wherein the at least one electrically conductive pathway includes an electrically conductive column aligned between the first device and second device, the electrically conductive column including conductive particles having a non-deterministic arrangement within a columnar volume extending from the first device to the second device, wherein the first optical signature and the second optical signature include the effects of the non-deterministic arrangement.

10. The signal security detection system of claim 8, wherein the optical detector is embedded within the first device.

11. The signal security detection system of claim 8, wherein the optical detector is embedded within the second device.

12. The signal security detection system of claim 8, wherein the light source generates the light within at least one of a visible band and an infrared band.

13. The signal security detection system of claim 8, further comprising a dye disposed at a selected location in the electrical interconnect, wherein the first optical signature and the second optical signature include the effects of the dye on the light.

14. An electrical system, comprising:
   a first device;
   a second device;
   an interconnect between the first device and the second device, the interconnect including a bonding material between the first device and the second device and at least one conductive pathway passing from the first device to the second device through the bonding material, the at least one electrically conductive pathway suitable for transmission of an electrical signal from the first device to the second device;
   a light source embedded in the first device for transmitting a light through the interconnect;
   an optical detector for receiving the light passing through the interconnect; and
   a processor configured to:
   record a first optical signature of the interconnect based on the light received at the optical detector at a first time, wherein the first optical signature is a first spatial pattern of light and shadow caused by the light from the light source passing through the bonding material, interacting with the at least one electrically conductive pathway within the bonding material, and being received at the optical detector at the first time;
   record a second optical signature of the interconnect based on the light received at the optical detector at a second time, wherein the second optical signature is a second spatial pattern of light and shadow caused by the light from the light source passing through the bonding material, interacting with the at least one electrically conductive pathway within the bonding material, and being received at the optical detector at the second time; and
   compare the second optical signature to the first optical signature to determine a security of the interconnect.

15. The electrical system of claim 14, wherein the at least one conductive pathway includes an electrically conductive column aligned between the first device and second device, the electrically conductive column including conductive particles having a non-deterministic arrangement within a columnar volume extending from the first device to the second device, wherein the first optical signature and the second optical signature include the effects of the non-deterministic arrangement.

16. The electrical system of claim 14, wherein the optical detector is embedded within one of the first device and the second device.

17. The electrical system of claim 14, wherein the light source generates the light within at least one of a visible band and an infrared band.

18. The electrical system of claim 14, further comprising a dye disposed at a selected location in the electrical interconnect, wherein the first optical signature and the second optical signature include the effects of the dye on the light.

* * * * *